US009258074B2

(12) United States Patent
Kosaka

(10) Patent No.: US 9,258,074 B2
(45) Date of Patent: Feb. 9, 2016

(54) WIRELESS COMMUNICATION SYSTEM

(71) Applicant: SHARP KABUSHIKI KAISHA, Osaka (JP)

(72) Inventor: Minoru Kosaka, Chiba (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/626,977

(22) Filed: Feb. 20, 2015

(65) Prior Publication Data

US 2015/0171981 A1 Jun. 18, 2015

Related U.S. Application Data

(66) Continuation of application No. 13/722,636, filed on Dec. 20, 2012, now Pat. No. 9,025,528, which is a continuation of application No. 13/584,462, filed on Aug. 13, 2012, now Pat. No. 8,369,309, which is a (Continued)

(30) Foreign Application Priority Data

Dec. 11, 2000 (JP) ................... 2000-376278

(51) Int. Cl.
*H04W 4/00* (2009.01)
*H04J 3/16* (2006.01)
(Continued)

(52) U.S. Cl.
CPC .............. *H04J 3/1694* (2013.01); *H04B 7/265* (2013.01); *H04J 3/06* (2013.01); *H04W 56/002* (2013.01); *H04W 56/0035* (2013.01);
(Continued)

(58) Field of Classification Search
None
See application file for complete search history.

(56) References Cited

U.S. PATENT DOCUMENTS 5,515,366 A 5/1996 Chieu et al.
5,600,635 A 2/1997 Hamaki et al.
(Continued)

FOREIGN PATENT DOCUMENTS

JP 6296163 A 10/1994
JP 8307934 A 11/1996
(Continued)

OTHER PUBLICATIONS

"Overview of the MAC Frame," ETSI TS 101 761-1 V1.1.1 (Apr. 2000), Broadband Radio Access Networks (BRAN); HIPERLAN Type 2; Data Link Control (DLC) Layer, Part 1: Basic Data Transport Functions, Apr. 2000, pp. 21-22, ETSI, France.

(Continued)

Primary Examiner — Kevin C Harper
(74) Attorney, Agent, or Firm — Kilpatrick Townsend & Stockton LLP

(57) ABSTRACT

A wireless communication system that includes a base station and one or more terminals carries out wireless data communication by use of a first frequency band. The wireless communication system includes a wireless access system that employs a CSMA/CA and/or TDMA/TDD system as the wireless access system of the wireless communication system and a control signal at the first frequency band is periodically broadcasts from the base station, where the control signal includes a control information configured to manage wireless data transmission by the one or more terminals. In addition to the first frequency band, one or more frequency bands different from the first frequency band for the wireless data transmission by the one or more terminals can be allocate by the base station, where the control signal at the first frequency band indicate the location of the one or more frequency bands which can be used.

11 Claims, 16 Drawing Sheets

Related U.S. Application Data continuation of application No. 13/117,462, filed on May 27, 2011, now Pat. No. 8,270,390, which is a division of application No. 10/432,994, filed on May 28, 2003, Substitute for application No. PCT/JP01/10498, filed on Nov. 30, 2001, now abandoned.

(51) Int. Cl.
| | | |
|---|---|---|
| *H04W 56/00* | (2009.01) | |
| *H04W 72/04* | (2009.01) | |
| *H04J 3/06* | (2006.01) | |
| *H04B 7/26* | (2006.01) | |
| *H04W 74/08* | (2009.01) | |
| *H04W 92/18* | (2009.01) | |
| *H04W 84/12* | (2009.01) | |

(52) U.S. Cl.
CPC ..... *H04W 72/0413* (2013.01); *H04W 72/0446* (2013.01); *H04W 74/0816* (2013.01); *H04W 84/12* (2013.01); *H04W 92/18* (2013.01)

(56) References Cited

U.S. PATENT DOCUMENTS

| | | | |
|---|---|---|---|
| 5,617,412 | A | 4/1997 | Delprat et al. |
| 5,675,629 | A | 10/1997 | Raffel et al. |
| 5,781,860 | A | 7/1998 | Lopponen et al. |
| 5,913,171 | A | 6/1999 | Solonen et al. |
| 5,943,326 | A | 8/1999 | Schroderus |
| 5,960,360 | A | 9/1999 | Carmon et al. |
| 5,995,500 | A | 11/1999 | Ma et al. |
| 5,995,844 | A | 11/1999 | Fukuda |
| 6,031,864 | A | 2/2000 | Bauchot et al. |
| 6,047,178 | A | 4/2000 | Frlan |
| 6,052,594 | A | 4/2000 | Chuang et al. |
| 6,069,901 | A | 5/2000 | Hulyalkar et al. |
| 6,111,909 | A | 8/2000 | Taki |
| 6,115,612 | A | 9/2000 | Fukuda |
| 6,144,656 | A | 11/2000 | Kinnunen et al. |
| 6,219,347 | B1 | 4/2001 | Uchida et al. |
| 6,230,015 | B1 | 5/2001 | Kinnunen et al. |
| 6,366,572 | B1 | 4/2002 | Esterberg et al. |
| 6,404,751 | B1* | 6/2002 | Roark ................ H04W 72/14 370/330 |
| 6,415,146 | B1 | 7/2002 | Capece |
| 6,456,613 | B1 | 9/2002 | Kato |
| 6,480,483 | B2 | 11/2002 | Yahata et al. |
| 6,504,834 | B1 | 1/2003 | Fifield |
| 6,574,266 | B1 | 6/2003 | Haartsen |
| 6,574,452 | B1 | 6/2003 | Morvan et al. |
| 6,650,629 | B1 | 11/2003 | Takahashi et al. |
| 6,678,341 | B1 | 1/2004 | Miyake et al. |
| 6,680,929 | B1 | 1/2004 | Iida et al. |
| 6,865,372 | B2 | 3/2005 | Mauney et al. |
| 7,068,639 | B1 | 6/2006 | Varma et al. |
| 8,270,390 | B2 | 9/2012 | Kosaka |
| 8,369,309 | B2 | 2/2013 | Kosaka |
| 8,570,950 | B2 | 10/2013 | Kosaka |
| 2001/0055297 | A1 | 12/2001 | Benveniste |
| 2002/0159404 | A1* | 10/2002 | Raissinia ............ H04W 52/221 370/318 |
| 2003/0112879 | A1* | 6/2003 | Antia et al. .................... 375/259 |
| 2003/0144003 | A1 | 7/2003 | Ranta et al. |
| 2004/0078824 | A1* | 4/2004 | Krisbergh ............... H04L 29/06 725/105 |

FOREIGN PATENT DOCUMENTS

| | | |
|---|---|---|
| JP | 9107583 A | 4/1997 |
| JP | 9298769 A | 11/1997 |
| JP | 10271038 A | 10/1998 |
| JP | 11098570 A | 4/1999 |
| JP | 11122663 A | 4/1999 |
| JP | 11275663 A | 10/1999 |
| JP | 11341564 A | 12/1999 |

OTHER PUBLICATIONS

U.S. Appl. No. 10/432,994, Non-Final Office Action mailed Mar. 21, 2005, 9 pages.
U.S. Appl. No. 10/432,994, Non-Final Office Action mailed Oct. 3, 2005, 12 pages.
U.S. Appl. No. 10/432,994, Final Office Action mailed May 19, 2006, 12 pages.
U.S. Appl. No. 10/432,994, Non-Final Office Action mailed Aug. 15, 2006, 11 pages.
U.S. Appl. No. 10/432,994, Non-Final Office Action mailed Jan. 26, 2007, 11 pages.
U.S. Appl. No. 10/432,994, Final Office Action mailed Jul. 31, 2007, 14 pages.
U.S. Appl. No. 10/432,994, Non-Final Office Action mailed Jan. 24, 2008, 12 pages.
U.S. Appl. No. 10/432,994, Final Office Action mailed Sep. 22, 2008, 16 pages.
U.S. Appl. No. 10/432,994, Advisory Action mailed Jan. 6, 2009, 3 pages.
U.S. Appl. No. 10/432,994, Non-Final Office Action mailed Apr. 2, 2009, 18 pages.
U.S. Appl. No. 10/432,994, Non-Final Office Action mailed Nov. 27, 2009, 18 pages.
U.S. Appl. No. 10/432,994, Non-Final Office Action mailed May 28, 2010, 23 pages.
U.S. Appl. No. 10/432,994, Final Office Action mailed Nov. 30, 2010, 19 pages.
U.S. Appl. No. 13/117,462, Non-Final Office Action mailed Dec. 23, 2011, 14 pages.
U.S. Appl. No. 13/117,462, Notice of Allowance mailed Jul. 18, 2012, 17 pages.
U.S. Appl. No. 13/584,462, Notice of Allowance mailed Sep. 21, 2012, 10 pages.
U.S. Appl. No. 13/722,636, Non-Final Office Action mailed Jul. 26, 2013, 8 pages.
U.S. Appl. No. 13/722,636, Final Office Action mailed Nov. 29, 2013, 8 pages.
U.S. Appl. No. 13/722,636, Non-Final Office Action mailed Aug. 11, 2014, 8 pages.
U.S. Appl. No. 13/722,636, Notice of Allowance mailed Nov. 21, 2014, 5 pages.
International Patent Application No. PCT/JP2001/010498, International Search Report mailed Mar. 5, 2002, 4 pages.

* cited by examiner

WIRELESS COMMUNICATION SYSTEM

This is a Continuation Application of co-pending application Ser. No. 13/722,636, filed on Dec. 20, 2012, which is a Continuation Application of application Ser. No. 13/584,462, filed on Aug. 13, 2012, issued as U.S. Pat. No. 8,369,309 on Feb. 5, 2013, which is a Continuation Application of application Ser. No. 13/117,462 filed on May 27, 2011, issued as U.S. Pat. No. 8,270,390 on Sep. 18, 2012, which is a Divisional Application of application Ser. No. 10/432,994 filed on May 28, 2003 (abandoned), which is a National Phase of PCT International Application No. PCT/JP01/10498 filed on Nov. 30, 2001, which claims the benefit of Japanese Patent Application No. 2000-376278, filed on Dec. 11, 2000. The entire contents of all of the above applications are hereby incorporated by reference.

TECHNICAL FIELD

The present invention relates to a wireless communication system comprised of a base station and mobile stations, particularly to an improvement relating to inter-mobile station direct communication in a wireless communication system based on a TDMA (Time Division Multiple Access) system.

BACKGROUND

A wireless communication system is comprised of a base station for giving notices of allocations of bands (time regions for communications) and a plurality of mobile stations based on the TDMA system (in which different time regions are allocated to the mobile stations at the same frequency for carrying out communication). For such a system, a PHS inter-mobile station direct communication system in accordance with RCR STD-28 (second-generation cordless telephone system standard, version 1) of ARIB (Association of Radio Industries and Businesses) has been proposed as a method of carrying out inter-mobile station direct communication at a frequency other than that used by the base station. Improvements of the system are disclosed in JP Patent Publication (Kokai) Nos. 11-122663 A1(1999) and 11-341564 A1(1999), for example.

FIG. 13 shows an example of the frame structure in the TDMA wireless communication system.

As shown in FIG. 13(a), a length of time in which the same frequency is used for communication is divided into frames 1 at predetermined time intervals. In each frame (at predetermined periods), the base station transmits control information 2 to all of the mobile stations in a wireless LAN area created by the base station. The control information 2 includes information allowing the multiple mobile stations to be synchronized with the base station, and information indicating the band (time region) within the frame allocated to each mobile station.

The frame is divided into the time regions of DOWN-LINK 3 for the transmission of data from the base station to the mobile stations and UP-LINK 4 for the transmission of data from the mobile stations to the base station. In each time region, each mobile station is allocated a band 5 (band A) and a band 6 (band B), as shown in FIG. 13(b), such that the base station and the mobile stations can communicate with one another bi-directionally.

The control information 2 will be hereafter described by referring to FIG. 13(c).

Generally, in the physical layer of wireless systems, a digital signal comprised of a preamble 200 for broadcast and a data payload 201 (data payload 1, . . . , data payload N), which is information data for transmission, is converted into an electric signal. The preamble 200 located at the head identifies the signal received from a wireless interface. Particularly, the preamble 200 for broadcast that is attached when the base station transmits broadcast information into a wireless cell functions as a synchronization signal with which a mobile station in the wireless cell attempts to achieve synchronization with the base station. Further, the control information 2 includes such control information as frame structure information and band allocation information.

FIG. 14 shows a block diagram of an example of the configuration of a wireless LAN based on the above-described wireless communication system.

In FIG. 14, numeral 7 designates a WAN (Wide Area Network), and numeral 8 designates a wireless LAN (Local Area Network). The wireless LAN 8 is comprised of a plurality of mobile stations 11-13 and a base station 10. The base station 10 is either connected to a central control unit 9 for the central control of band allocations, or is equipped with the central control unit 9 inside. The wireless LAN 8 is connected to the WAN 7 via the base station 10.

The mobile stations 11 to 13 carry out a base station-mobile station communication according to the band allocation information notified by the base station 10. The communication paths are indicated as communication paths 14-16. The communication path for direct communication between a mobile station 11 (mobile station <1>) and a mobile station 12 (mobile station <2>) is indicated by a communication path 17.

When the mobile station 11 (mobile station <1>) transmits data to the mobile station 12 (mobile station <2>), if the normal base station-mobile station communication is employed, the same data would have to be transmitted twice via the communication paths 14 and 15 shown in FIG. 14, which is inefficient. Thus, it is necessary to use a method for carrying out inter-mobile station direct communication by which data is directly transmitted between the mobile stations via the communication path 17 without the intervention of the base station 10.

FIG. 15 shows an example of the frame structure for inter-mobile station direct communication in a conventional wireless communication system.

In the example of FIG. 15, inter-mobile station direct communication is conducted at a frequency different from the one used by the base station 10. One of the mobile stations that carry out inter-mobile station direct communication transmits control information 19 at the frequency for inter-mobile station direct communication. This frequency is different from the frequency at which frame synchronization is achieved and communications are carried out according to the control information 18 transmitted by the base station. The mobile stations that carry out the inter-mobile station direct communication are provided with a base-station function for synchronizing their frames and allocating bands.

Other examples of conventional techniques for carrying out inter-mobile station direct communication include: a wireless LAN system and a PDC (Personal Digital Cellular) portable telephone employing the CSMA/CA (Carrier Sense Multiple Access with Collision Avoidance) system according to the ISO/IEC (International Organization for Standardization/International Electrotechnical Commission) 8802-11 or the IEEE (Institute of Electrical and Electronics Engineers) 802.11 standards; HiperLAN according to the ETSI (European Telecommunications Standards Institute), which is a 3.5-generation system transitioning into a $4^{th}$-generation system to be standardized around the year 2010 following PHS (Personal Handy-phone System) and the W-CDMA (Wide-band Code Division Multiple Access); and the MMAC (Multimedia Mobile Access Communication System) wireless system according to the ARIB (Association of Radio Industries and Businesses).

The IEEE802.11 and the HiperLAN will be briefly described below, although they do not have direct relevance to the present invention in that the former is not a centrally controlled wireless system comprising a central control unit for centrally controlling band allocations, and that the latter is a system that employs the same frequency as that for base station-mobile station communication.

FIG. 16 shows an example of communication according to the IEEE802.11 system.

In FIG. 16, among mobile stations 1 to 4 in a wireless LAN area 20, when a mobile station <1> wishes to send information to a mobile station <2>, the mobile station <1> broadcasts an RTS (Request to Send) signal 21 and 24. Each mobile station analyzes the RTS signal. When it is not an information transmission request directed to a particular mobile station, the mobile station stands by. When the RTS signal is directed to a particular mobile station, the mobile station (mobile station <2>) transmits a CTS (Clear to Send) signal 22 and 25 to indicate that it is ready to receive. In response, the mobile station <1> transmits information via a MAC signal 23 and 26 to the mobile station <2>. During these processes, the other mobile stations refrain from transmission for a certain time period to avoid collision of transmission signals.

FIG. 17 shows an example of the frame structure in the HiperLAN system. Parts or elements similar to those shown in FIG. 13 are designated by similar references.

In the HiperLAN system, a band 28 is provided in a TDMA frame 27 for carrying out inter-mobile station direct communication. In this band 28, the base station ceases transmission to allow the mobile stations to transmit to each other, thus allowing base station-mobile station communication and inter-mobile station direct communication to take place on a single frequency.

In a conventional wireless communication system, the frames for inter-mobile station direct communication and those for base station-mobile station communication are not synchronized, as shown in FIG. 15. Thus, in order to obtain control information for synchronizing the respective frames, the communication modes are switched. This is a process in which a mobile station terminates its connection with the base station for base station-mobile station communication and then sets up a connection with the mobile station that has the base-station function for carrying out inter-mobile station direct communication. An improved method of obtaining broadcast information from the base station is proposed by JP Patent Publication (Kokai) No. 11-122663 A1(1999), for example, in which the switching is carried out intermittently.

However, the apparatus disclosed in the above publication has the problem that the mobile station 11 (mobile station <1>) cannot carry out data communication with the mobile station 12 (mobile station <2>) and the base station 10 simultaneously, as shown in FIG. 14. In recent communication systems, there is an ongoing shift from voice communication by telephone to data communication. Thus, the above problem means that, in the context of building a wireless LAN, the mobile stations are intermittently cut off from the network, creating further problems. For example, the base station may not be able to transmit data received from a connected WAN (such as the Internet) to a destination mobile station in the wireless LAN, or the base station may not even recognize the presence of the mobile station due to the absence of connection therewith.

The above discussion is based on the assumption of creating, for example, a household wireless LAN (home network) comprised of a gateway unit including a base station connected to the Internet outside, and mobile stations including household information appliances (such as a refrigerator, microwave oven, television, video server, or set-top box, for example). In this case, it would be problematic if the external network could not send video information to the video server when the video server is wirelessly transmitting video information to the television, or if, when an air conditioner should be externally operated, the presence of the air conditioner on the network could not be confirmed due to the termination of its connection to the base station.

Further, in order to realize inter-mobile station direct communication, there is the additional problem of having to add the base-station function to one of the mobile stations that is to act as the base station.

It is an object of the invention to provide an efficient wireless communication system that allows for base station-mobile station communication even when inter-mobile station direct communication is carried out at a frequency other than that of the base station, which can reduce the burden on the mobile stations by having the base station control inter-mobile station direct communication, and which allows a plurality of frequencies to be simultaneously used by a single base station.

DISCLOSURE OF THE INVENTION

A wireless communication system that is comprised of a base station and mobile stations wirelessly connected to the base station, wherein the mobile stations can communicate with one another without the intervention of the base station, the system further comprising a synchronizing means, wherein
when a second frequency is used for an inter-mobile station direct communication which is different from a first frequency used for a base station-mobile station communication, the synchronizing means synchronizes a frame in the base station-mobile station communication with that in the inter-mobile station direct communication based on control information used in the base station-mobile station communication.

A mobile station is provided that is wirelessly connected to a base station and capable of a base station-mobile station communication at a first frequency and an inter-mobile station direct communication at a second frequency that is different from the first frequency without the intervention of the base station, the mobile station comprising a synchronizing means for synchronizing a frame in a base station-mobile station communication with that in an inter-mobile station direct communication based on control information used in the base station-mobile station communication.

A base station in a wireless communication system is provided that is comprised of the base station and mobile stations wirelessly connected to the base station, the base station comprising an allocation means for allocating a second frequency for an inter-mobile station direct communication which is different from a first frequency used for a base station-mobile station communication in response to a request from a mobile station.

A base station in a wireless communication system is provided that is comprised of the base station and mobile stations wirelessly connected to the base station, the system capable of conducting a base station-mobile station communication at a first frequency and an inter-mobile station direct communication at a second frequency different from the first frequency without the intervention of the base station, the base station comprising:

an allocation means for allocating bands in a frame for an inter-mobile station direct communication based on a request from a mobile station.

The base station may comprise a carrying means for performing carrier sensing at a plurality of available frequencies and for carrying available frequencies other than a frequency used by the base station.

DETAILED DESCRIPTION

The invention will be hereafter described in detail by referring to the attached drawings.

First Embodiment

Figure 1:
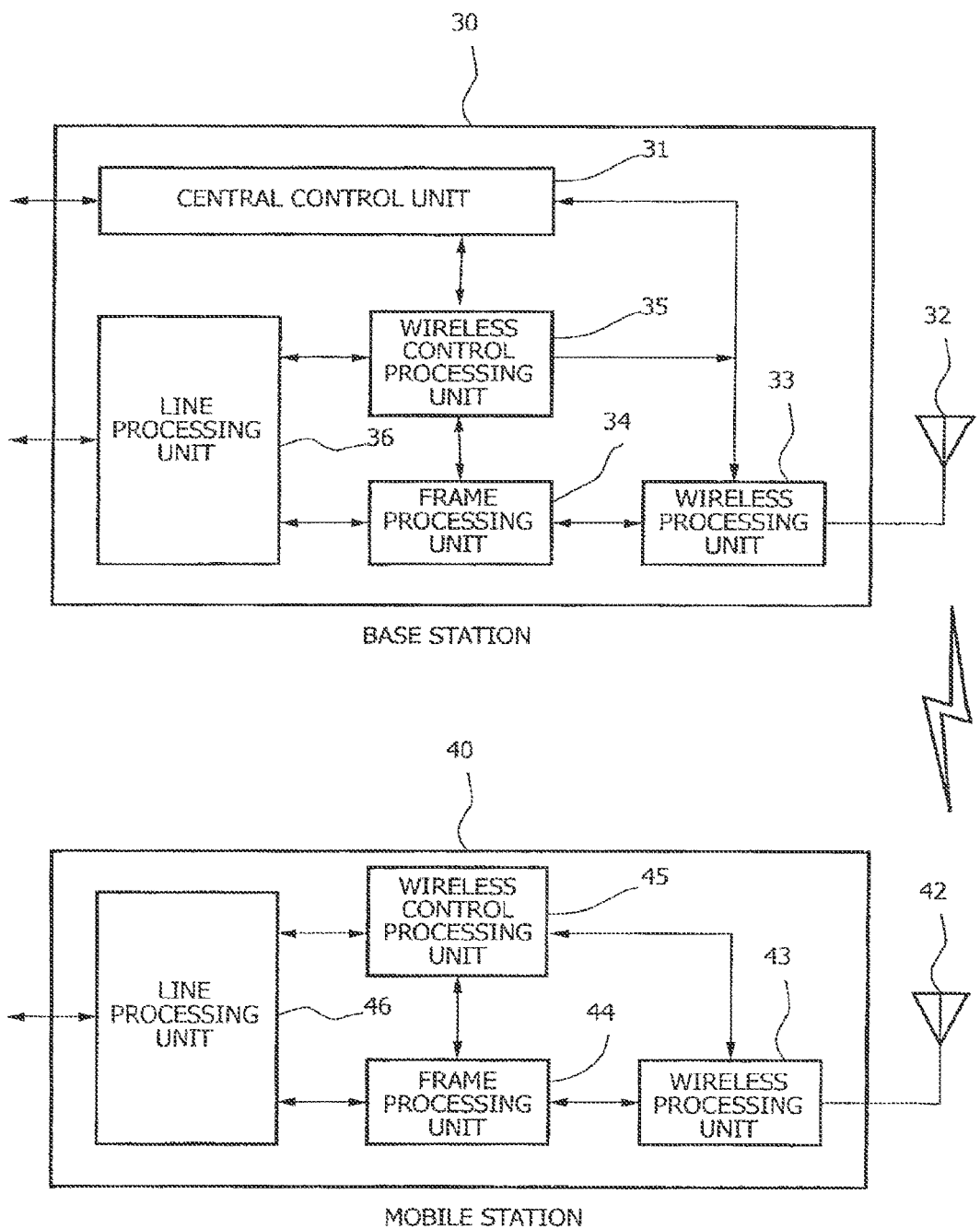
FIG. 1 shows block diagrams of examples of a base station and a mobile station in the wireless communication system.

FIG. 1 shows a block diagram of a base station and a mobile station in a wireless communication system according to the first embodiment of the invention.

Referring to FIG. 1, numeral 30 designates a base station in the wireless communication system, and numeral 40 designates a mobile station that communicates wirelessly with the base station 30. The base station 30 includes a central control unit 31.

The base station 30 comprises a central control unit 31 for allocating bands in a frame of a communication frequency in response to a band allocation request; an antenna 32 for wireless transmission and reception; a wireless processing means 33 for detecting available frequencies; a frame processing means 34 for carrying out frame processing by which control information such as allocated band allocation information is converted into transmission data; a wireless control means 35 for creating control information such as a frame synchronizing signal and band allocation information concerning allocations by the central control unit 31; and a line processing means 36 for sending external transmission data to the frame processing means 34 in a certain format in response to an instruction from the wireless control means 35. The central control unit 31 carries out calculations for time allocation, for example, and it may be either included in the base station 30, as according to the present embodiment, or located outside the base station 30.

The mobile station 40 comprises an antenna 42 for wireless transmission and reception; a wireless processing means 43 for receiving communication data and sending it to the frame processing means 44; a frame processing means 44 for achieving frame synchronization based on a control signal received from the base station 30 and separating the communication data into control information and reception data; a wireless control means 45 for decoding the band allocation information and the like and preserving it as control information for use in the communication data transmission/reception processing; and a line processing means 46 for sending external transmission data to the frame processing means 44 in a certain format in accordance with an instruction from the wireless control means 45.

The wireless control processing means 45 notifies the wireless processing means 43 of the start of a transmission/reception operation upon encountering an allocated band (time) in a frame. In the case of inter-mobile station direct communication, the wireless control processing means 45 notifies the wireless processing means 43 of a change of frequency to that used for inter-mobile station direct communication.

In accordance with the present embodiment, the wireless communication system comprises a synchronizing means for synchronizing, when a second frequency is to be used for inter-mobile station direct communication that is different from a first frequency used for base station-mobile station communication, frames between the base station-mobile station communication and the inter-mobile station direct communication, on the basis of control information used in the base station-mobile station communication. The wireless communication system also comprises an allocation means for allocating bands and a frequency for inter-mobile station direct communication in accordance with an allocation request from the base station 30 or mobile station 40. The base station 30 and mobile station 40 each comprise a transmission means and a reception means for transmitting and receiving allocation requests and allocation notifying information between them. The mobile station 40 further comprises a control means for changing the wireless frequency in accordance with an allocation. Thus, a base station-mobile station communication can be carried out simultaneously with an inter-mobile station direct communication. The base station 30 also carries out carrier sensing at a plurality of available frequencies and comprises a means for carrying available frequencies other than that used by the base station 30.

Figure 2:
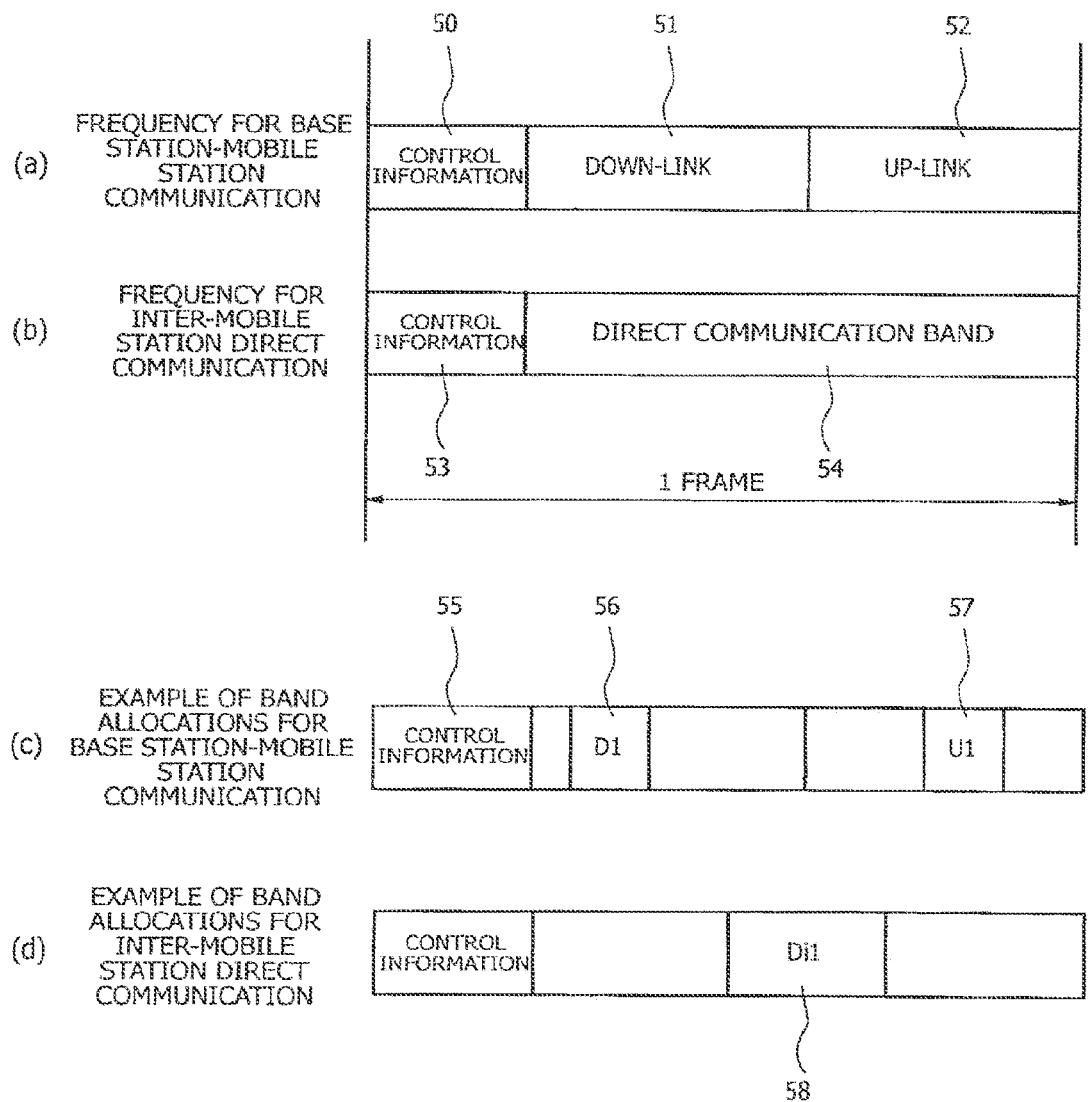
FIG. 2 shows an example of the frame structure in an inter-mobile station direct communication in the wireless communication system.
Figure 15:
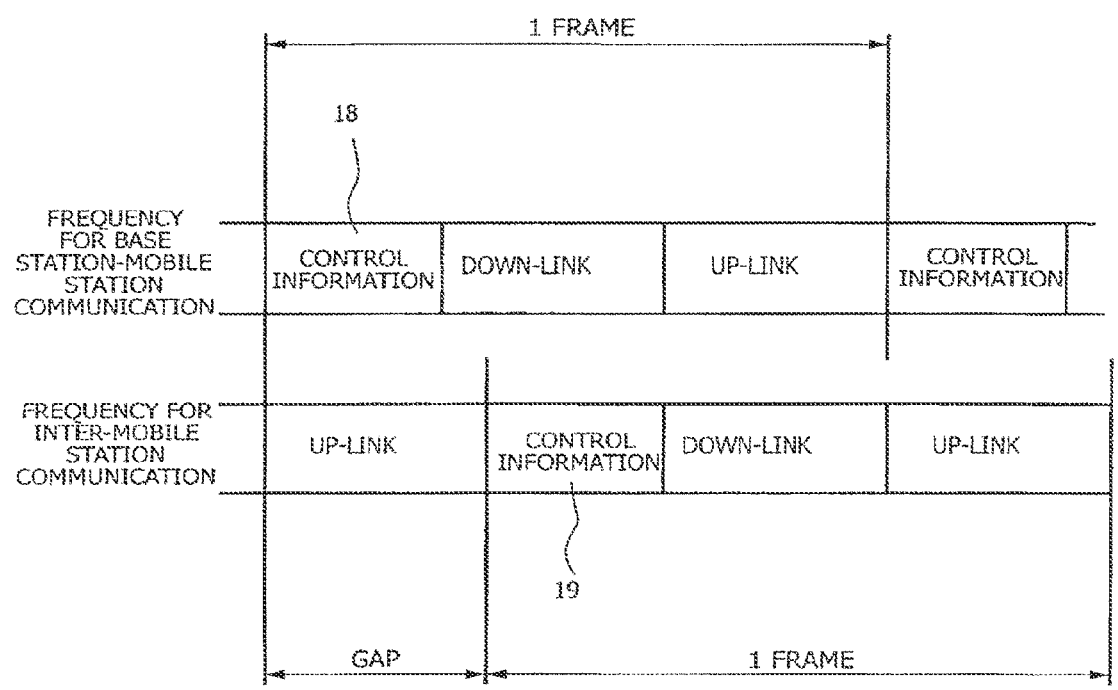
FIG. 15 shows an example of the frame structure for an inter-mobile station direct communication in the conventional wireless communication system.
Figure 16:
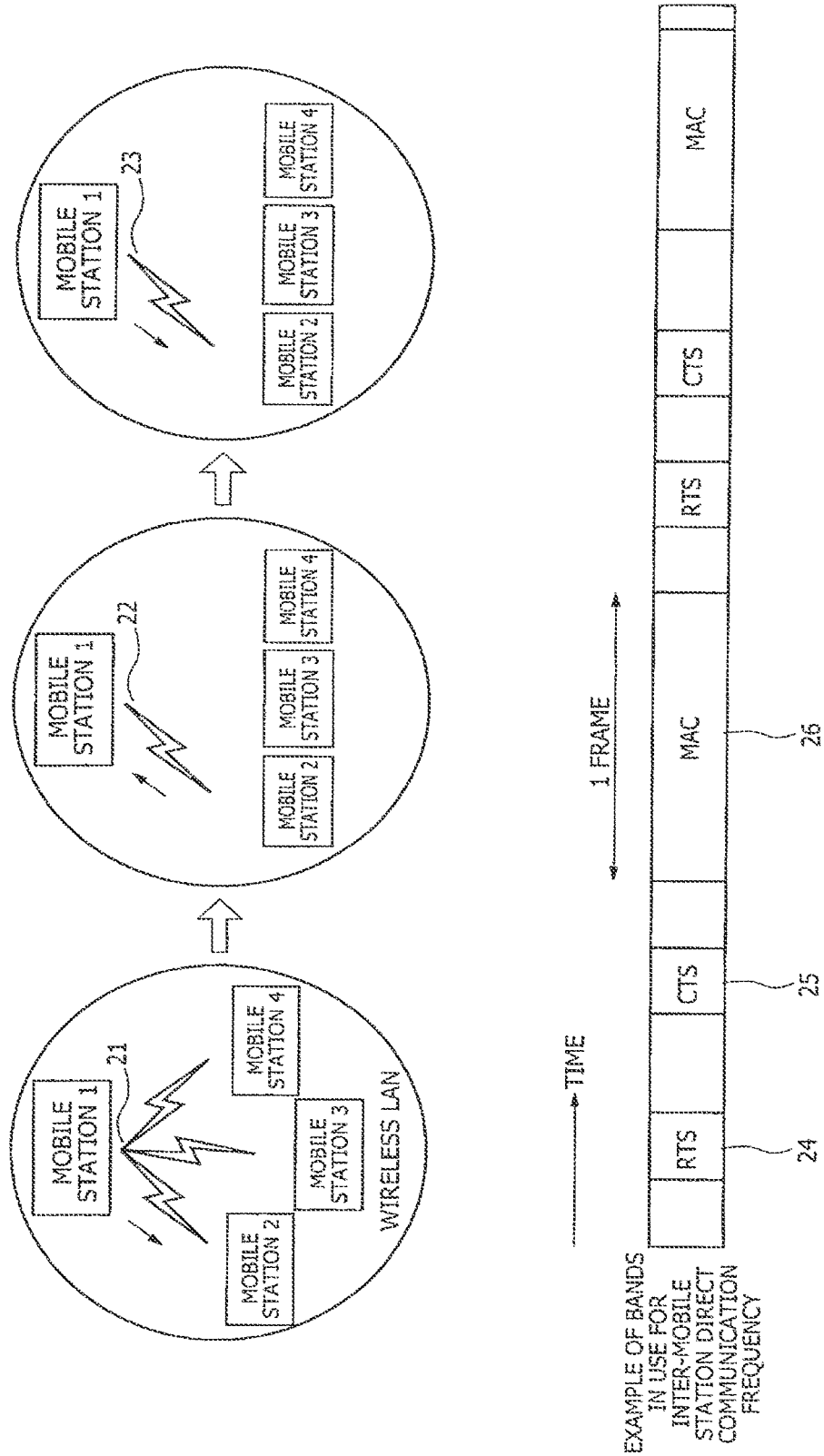
FIG. 16 shows an example of communication according to the IEEE802.11 system.
Figure 17:
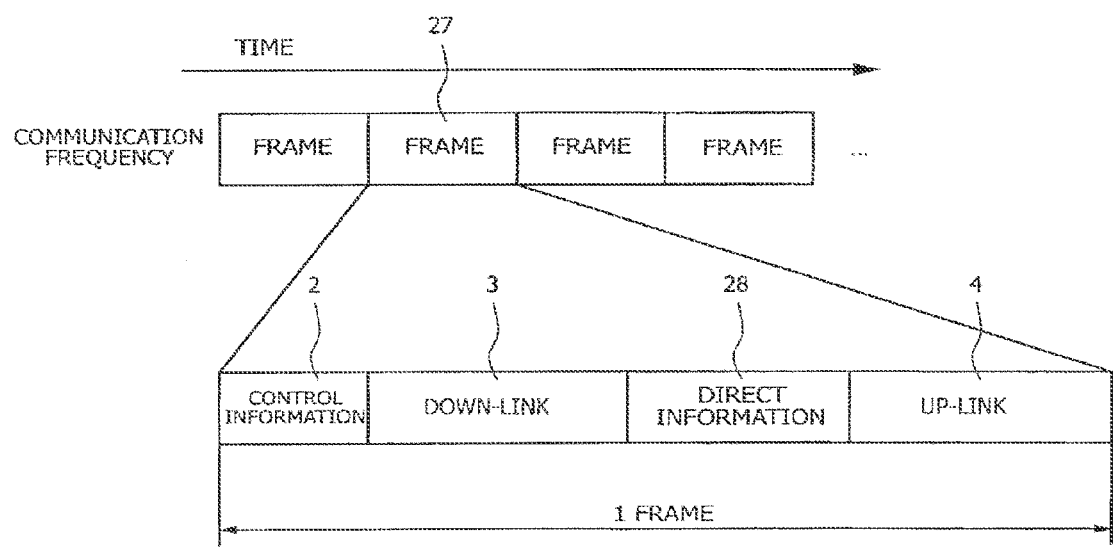
FIG. 17 shows an example of the frame structure according to the HiperLAN system.

FIG. 2 shows an example of frame structure in inter-mobile station direct communication according to the present wireless communication system, showing examples of frame structure and band allocation. The frame structures correspond to those of the conventional example shown in FIG. 15.

Figure 13:
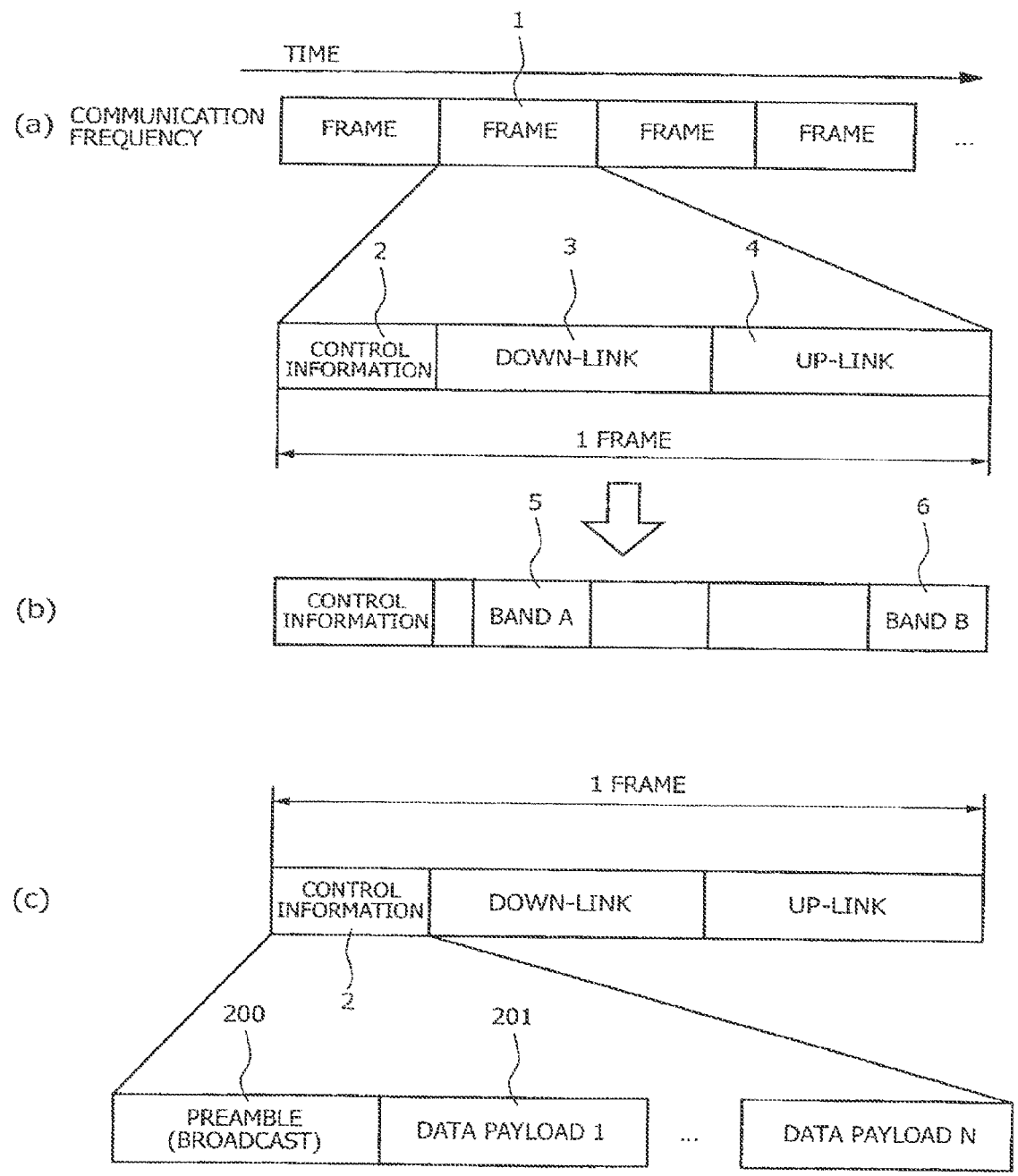
FIG. 13 shows an example of the frame structure in a conventional TDMA wireless communication system.

Referring to FIGS. 2(*a*) and (*b*), the frame structure is divided into time regions consisting of control information 50, a communication band DOWN-LINK 51, and a communication band UP-LINK 52. The control information 50 includes information for a plurality of mobile stations 40 to achieve synchronization with a base station 30 in each frame (at predetermined periods), and information indicating a band (time region) in a frame allocated to each mobile station. The DOWN-LINK 51 is for sending data from the base station 30 to the mobile stations 40. The UP-LINK 52 is for sending data from the mobile stations 40 to the base station 30. The control information 50 includes a preamble 200 for broadcast and a data payload 201, as described with reference to FIG. 13(*c*). The preamble 200 for broadcast includes a synchronizing signal for the mobile stations in a wireless cell to achieve synchronization with the base station, and control information such as frame structure information and band allocation information.

Referring to FIG. 2(*b*), a mobile station carries out inter-mobile station direct communication at an inter-mobile station direct communication frequency which is different from the frequency at which frame synchronization is achieved and communication is carried out based on the control information 50 transmitted by the base station 30. The mobile station synchronizes frames between base station-mobile station communication and inter-mobile station direct communication by utilizing the base station-mobile station communication control information 50 instead of the control information 53 for the conventional inter-mobile station direct communication. Numeral 54 designates a direct communication band.

FIG. 2(*c*) shows an example of band allocation in base station-mobile station communication. Numeral 55 designates control information where the control information 50 is allocated. Numeral 56 designates a band D1 where the DOWN-LINK 51 is allocated. Numeral 57 designates a band U1 where the UP-LINK 52 is allocated.

FIG. 2(*d*) shows an example of band allocation in inter-mobile station direct communication. As described above, the control information (control information 53) for the conventional inter-mobile station direct communication is not used, because the base station-mobile station communication control information 50 is also used for the inter-mobile station direct communication. Numeral 58 designates a band Di1 where the direct communication band 54 is allocated.

Thus, by synchronizing frames between base station-mobile station communication and inter-mobile station direct communication, it becomes possible to process in parallel the communication band DOWN-LINK 51 from the base station 30 to the mobile stations 40, the communication band UP-LINK 52 from the mobile stations 40 to the base station 30, and the direct communication band 54 from one mobile station 40 to another mobile station 40.

Hereafter, the operation of the wireless communication system as configured above will be described.

Figure 3:
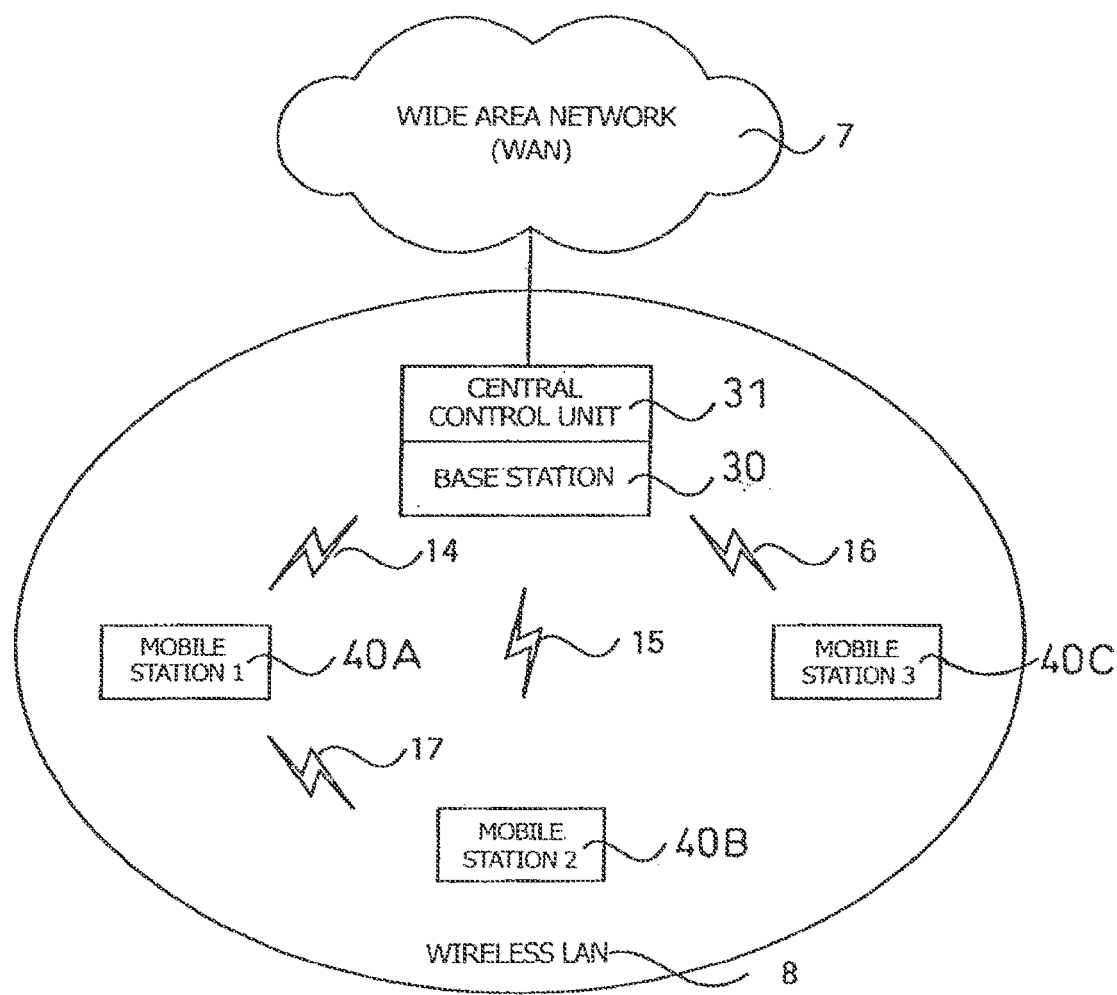
FIG. 3 shows a block diagram of an example of a wireless LAN based on the wireless communication system.
Figure 14:
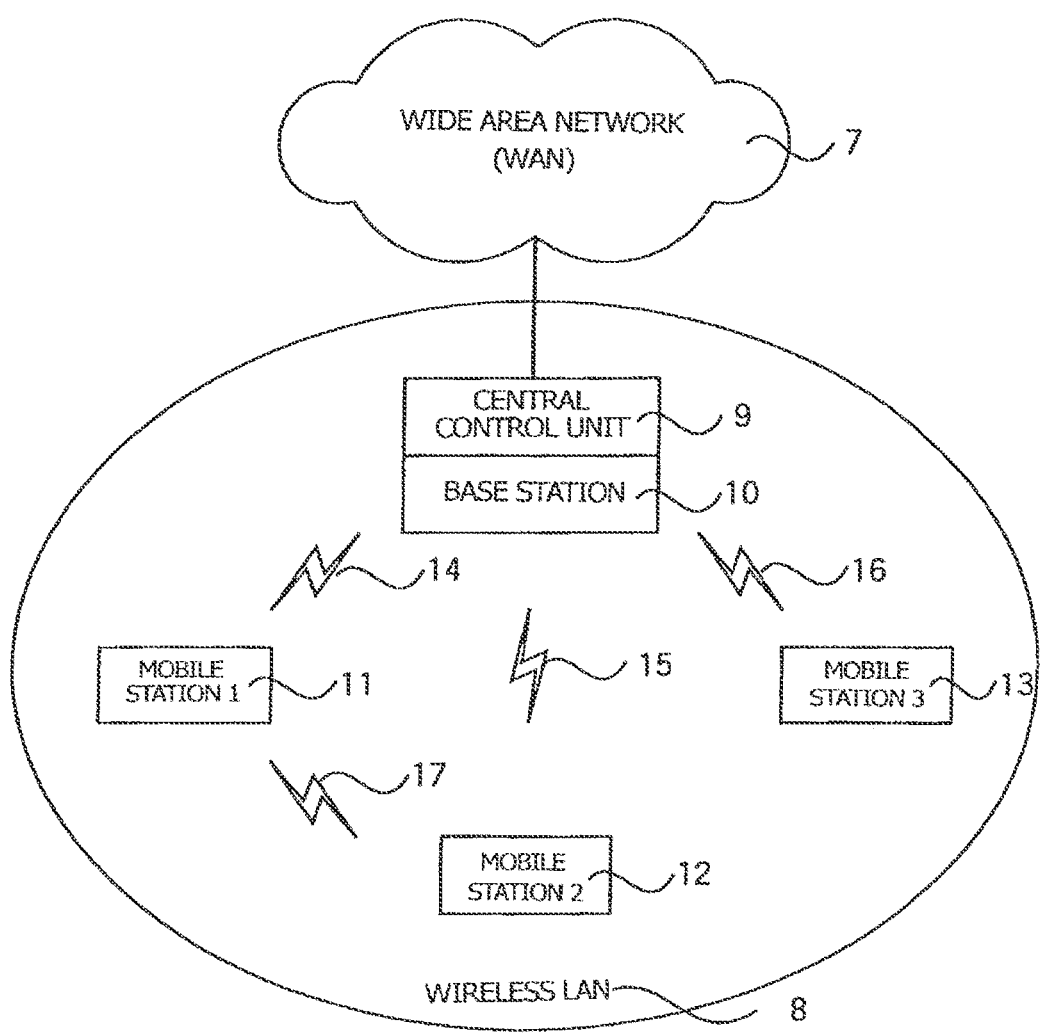
FIG. 14 shows a block diagram of an example of a wireless LAN based on the conventional wireless communication system.

FIG. 3 shows a block diagram of an example of a wireless LAN based on the present wireless communication system. Parts or elements similar to those shown in FIG. 14 are designated by similar references.

In FIG. 3, a wireless LAN 8 is comprised of a plurality of mobile stations 40A to 40C, and a base station 30 with a central control unit 31 built inside. The wireless LAN 8 is connected to a WAN 7 via the base station 40.

The mobile stations 40A to 40C are similar in structure to those mobile stations 40 shown in FIG. 1, and they carry out base station-mobile station communication in accordance with band allocation information notified from the base station 40. The communication paths are indicated by communication paths 14 to 16. A communication path for inter-mobile station direct communication between the mobile station 40A (mobile station <1>) and the mobile station 40B (mobile station <2>) is indicated by a communication path 17.

An example of band allocation for the base station 30 and the mobile station 40A (mobile station <1>) that wants to communicate with the mobile station 40B (mobile station <2>) will be described by referring to FIG. 2.

In FIGS. 2 and 3, the mobile station 40A (mobile station <1>) receives frame synchronization and band allocation based on the control information 55 from the base station 30. A band 56 (band D1) is a communication band from the base station 30 to the mobile station 40A (mobile station <1>). A band 57 (band U1) is a communication band from the mobile station 40A (mobile station <1>) to the base station 30. A band 58 (band Di1) is a communication band from the mobile station 40A (mobile station <1>) to the mobile station 40B (mobile station <2>). By carrying out communication according to these allocations, the mobile station 40A (mobile station <1>) can perform data communication simultaneously with the mobile station 40B (mobile station <2>) and the base station 30 without interrupting its connection with the base station 30.

Figure 4:
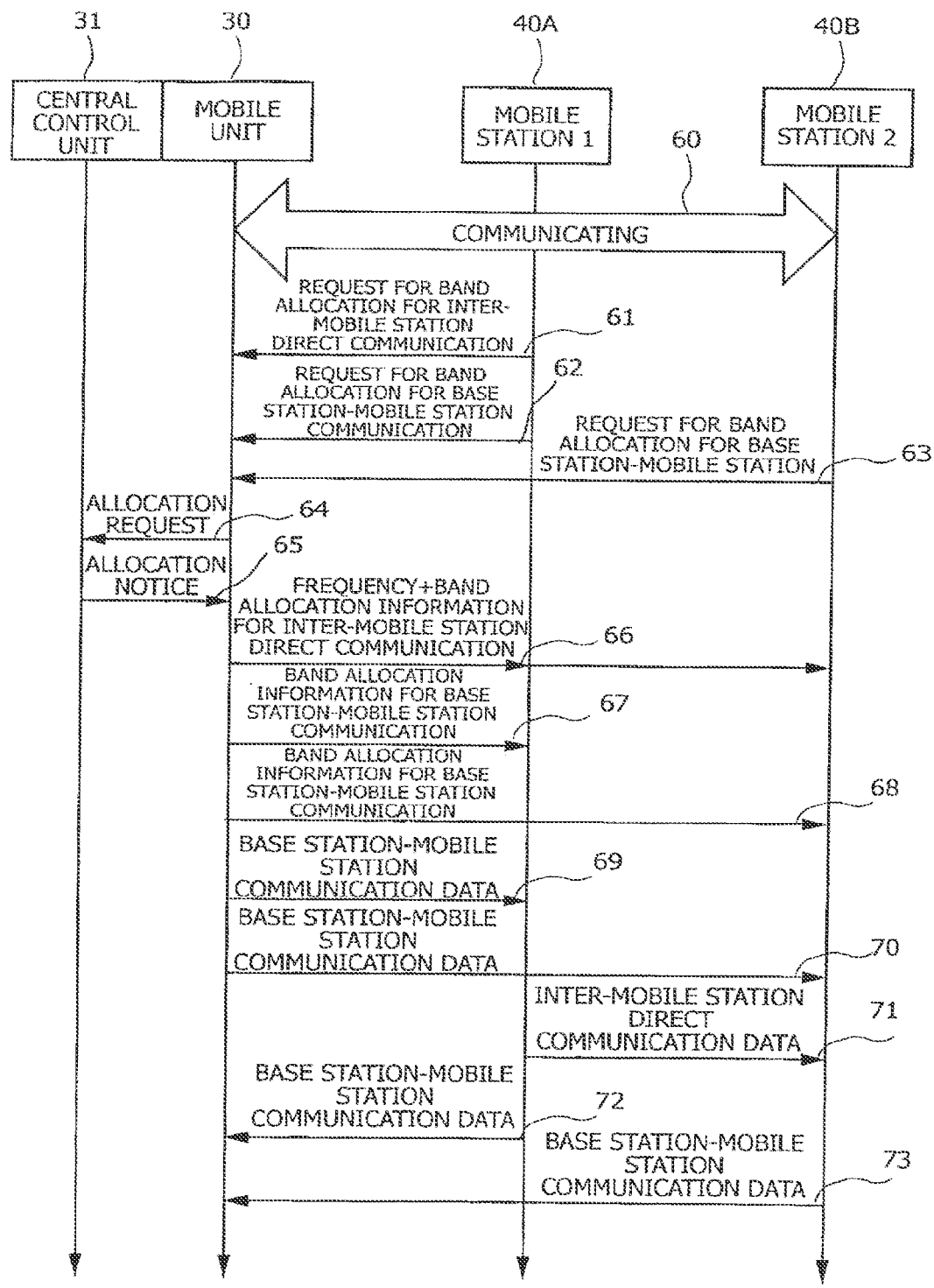
FIG. 4 shows a control sequence chart illustrating the flow of data in an example of communication in the wireless communication system.

FIG. 4 shows a control sequence chart indicating the flow of data in the above example of communication. The numbers in the drawing show the individual processing steps.

In FIG. 4, it is assumed that the mobile station 40A (mobile station <1>) and the mobile station 40B (mobile station <2>) have completed connection with the base station 30 and have started communication therewith (60).

Initially, the mobile station 40A (mobile station <1>) transmits a request (61) and another request (62) to the base station 30 in an allocated band of the UP-LINK 52. The request (61) calls for the allocation of a band for inter-mobile station direct communication for transmitting data to the mobile station 40B (mobile station <2>). The request (62) calls for the allocation of a band for normal base station-mobile station communication.

The mobile station 40B (mobile station <2>) also transmits a request (63) to the base station 30 in an allocated band of the UP-LINK 52, calling for the allocation of a band for normal base station-mobile station communication.

The base station 30 then transmits an allocation request (64) to the central control unit 31 which bundles the band allocation request information from each mobile station and the band allocation request from the base station 30 to the mobile station.

The central control unit 31, in response to the band allocation request (64), notifies the base station 30 of information about the allocations of bands in the next frame of the base station-mobile station communication frequency and the inter-mobile station direct communication frequency (65).

The base station 30 transmits, in the control information band in the next frame, information about the band and frequency allocation for direct communication from the mobile station 40A (mobile station <1>) to the mobile station 40B (mobile station <2>) (66), and base station-mobile station communication band allocation information (67, 68) to the mobile station 40A (mobile station <1>) and the mobile station 40B (mobile station <2>). Each mobile station carries out reception processing on the control information band.

The base station 30, in an allocated band in the DOWN-LINK 51 at the base station-mobile station communication frequency, transmits base station-mobile station communication data (69, 70) to the mobile station 40A (mobile station <1>) and the mobile station 40B (mobile station <2>). Each mobile station carries out reception processing on an allocated band.

The mobile station 40A (mobile station <1>) transmits inter-mobile station direct communication data (71) to the mobile station 40B (mobile station <2>) in an allocated band for direct communication of the inter-mobile station direct communication frequency. The mobile station 40B (mobile station <2>) carries out a reception processing on an allocated band.

The mobile station 40A (mobile station <1>) and the mobile station 40B (mobile station <2>) transmit base station-mobile station communication data (72, 73) to the base station 30 on an allocated band in the UP-LINK 52. The base station 30 carries out a reception processing on an allocated band.

Figure 5:
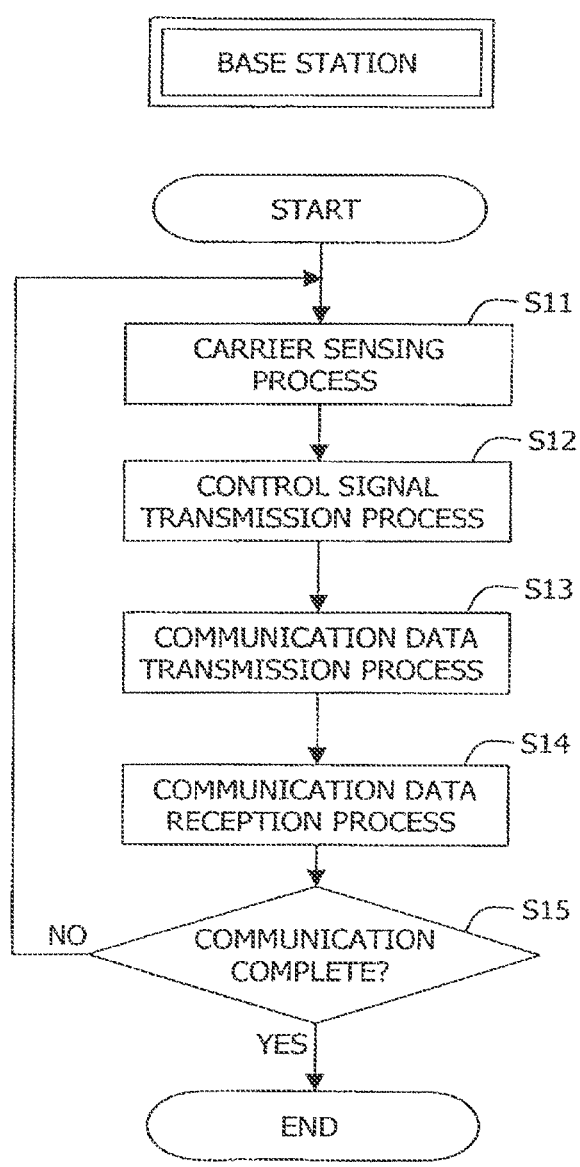
FIG. 5 shows a flowchart of communication processes performed in the base station in the wireless communication system.

FIG. 5 shows a flowchart of the communication processing in the base station 30. S indicates the steps thereof.

Initially, in a carrier sensing process in step S11, available frequencies are detected by the wireless processing means 33 (FIG. 1) of the base station 30. Of the frequencies that are detected, one that is used by the base station 30 is selected, and preparations are made for transmission and reception. At the same time, notification of frequencies available for inter-mobile station direct communication is given to the central control unit 31. Simultaneously, notification of available frequencies other than those used by the base station 30 is given to the central control unit 31.

In the process of transmitting a control signal in step S12, the wireless control means 35 creates control information including a signal for frame synchronization and band allocation information allocated by the central control unit 31. The control information is converted into transmission data by the frame processing means 34, and then transmitted via the wireless processing means 33 and antenna 32.

In the process of transmitting the communication data in step S13, the line processing means 36 transmits external transmission data to the frame processing means 34 in accordance with instructions from the wireless control means 35. The data is converted into transmission data by the frame processing means 34 and then transmitted via the wireless processing means 33 and antenna 32.

In the process of receiving the communication data in step S14, the wireless signal is received by the antenna 32 and the wireless processing means 33. The received data is separated into control information and reception data by the frame processing means 34. The control information such as a band allocation request is processed by the wireless control means 35, and necessary information is transmitted to the central control unit 31, where it is processed. The reception data is transmitted to the outside by the line processing means 36 after being set in an external format.

In step S15, it is determined whether or not communication is finished. If not, the process resumes from step S11 and the above-described steps are repeated. If the communication is finished, the present process comes to an end.

Figure 6:
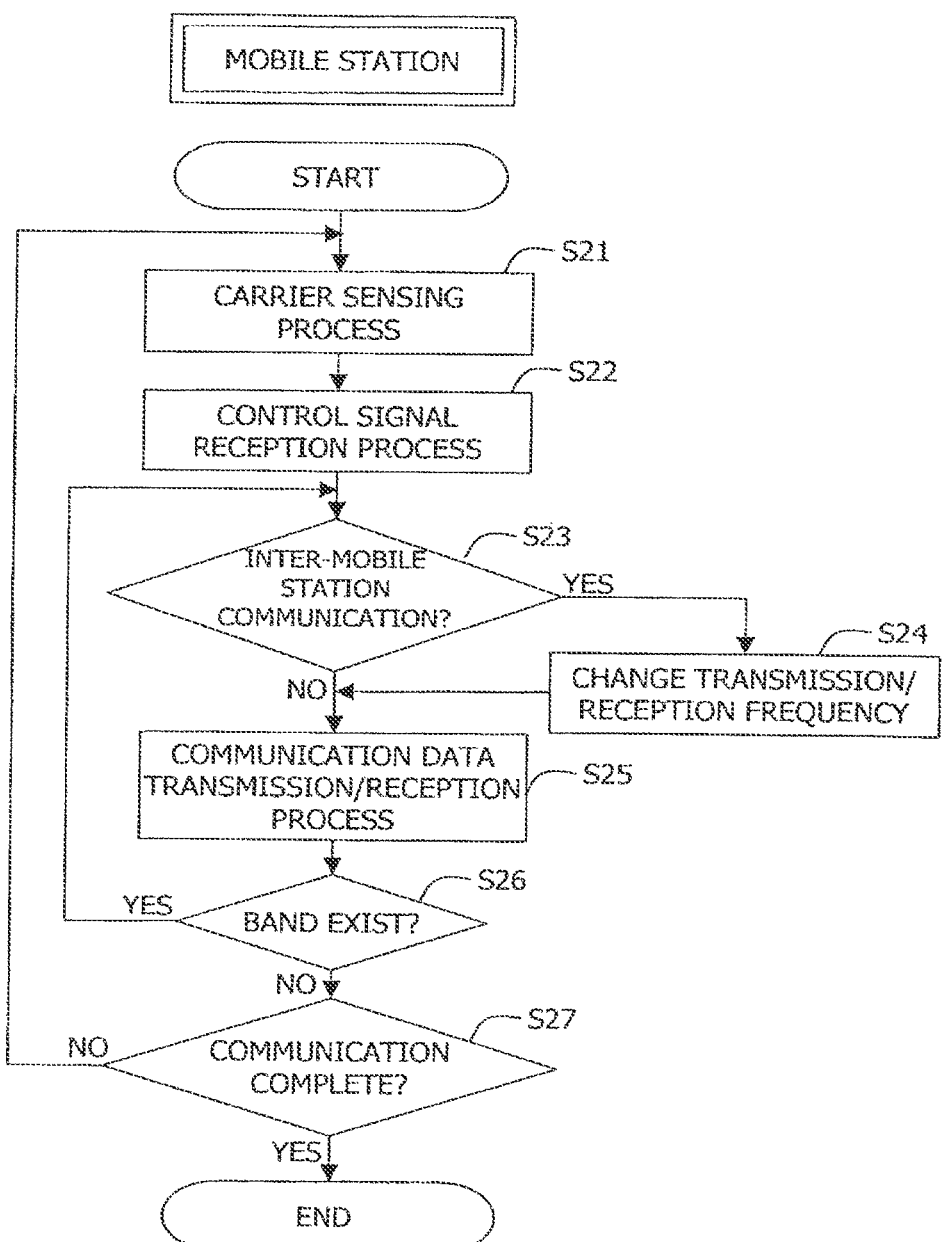
FIG. 6 shows a flowchart of communication processes performed in the mobile station in the wireless communication system.

FIG. 6 shows a flowchart of the communication processing performed in the mobile station.

In a carrier sensing step of step S21, available frequencies are detected by the wireless processing means 43.

In the process of receiving the control signal in step S22, frame synchronization is carried out based on the control signal transmitted from the base station 30 and received by the antenna 42 and the wireless processing means 43. The control signal is converted into control information by the frame processing means 44. The wireless control processing means 45 decodes band allocation information and the like from the control information and stores it as control information for use during the process of transmitting and receiving communication data.

Upon reaching an allocated band (time) in a frame, the wireless control processing means 45 notifies the wireless processing means 43 of the start of a transmission/reception operation. In step S23, it is determined whether or not the communication is inter-mobile station direct communication. If so, the wireless processing means 43 is notified of a change of frequency to that used for inter-mobile station direct communication in step S24. The transmission/reception frequency is then changed and the routine progresses to step S25. If the communication is not inter-mobile station direct communication, the routine progresses to step S25.

In the process of transmitting and receiving communication data in step S25, the wireless processing means 43 receives the communication data and sends it to the frame processing means 34, where the data is separated into control information and reception data. The control information is processed by the wireless control means 35. The reception data is sent to the outside by the line processing means 36 after being set in an external format. External transmission data is sent by the line processing means 36 to the frame processing means 34 in accordance with an instruction from the wireless control means 35, where the data is converted into transmission data and then transmitted by the wireless processing means 43 and antenna 42.

In step S26, it is determined whether or not there is a band. If there is a band, the routine returns to step S23 to repeat the above-described processes. If not, it is determined in step S27 whether or not communication is finished. If not, the routine returns to step S21 to repeat the relevant steps. If the communication is finished, the present process comes to an end.

Thus, in accordance with the present embodiment, the wireless communication system comprises a synchronization means for, when the central control unit 31 uses a second frequency for inter-mobile station direct communication which is different from the first frequency used for base station-mobile that communication, synchronizing frames between base station-mobile station communication and inter-mobile station direct communication based on the control information used in base station-mobile station communication. The system also comprises an allocation means for allocating a band and frequency for the inter-mobile station direct communication in accordance with an allocation request from the base station 30 or the mobile stations 40. Because the control information 55 for base station-mobile station communication is utilized instead of the control information for the normal inter-mobile station direct communication in synchronizing frames between base station-mobile station communication and inter-mobile station direct communication, it is possible to process in parallel the band DOWN-LINK 51 for communication from the base station 30 to the mobile stations 40, the band UP-LINK 52 for communication from the mobile stations 40 to the base station 30, and the band 54 for communication from one mobile station 40 to another mobile station 40.

Thus, an inter-mobile station direct communication and a base station-mobile station communication can be simultaneously conducted, or the inter-mobile station direct communication can be conducted while maintaining connection with the base station 30, even when the inter-mobile station direct communication is conducted at a frequency other than that of the base station 30.

Further, because the base station controls the inter-mobile station direct communication, the burden on the mobile stations can be reduced.

Second Embodiment

In the second embodiment, the manner in which communication bands are allocated is changed.

Figure 7:
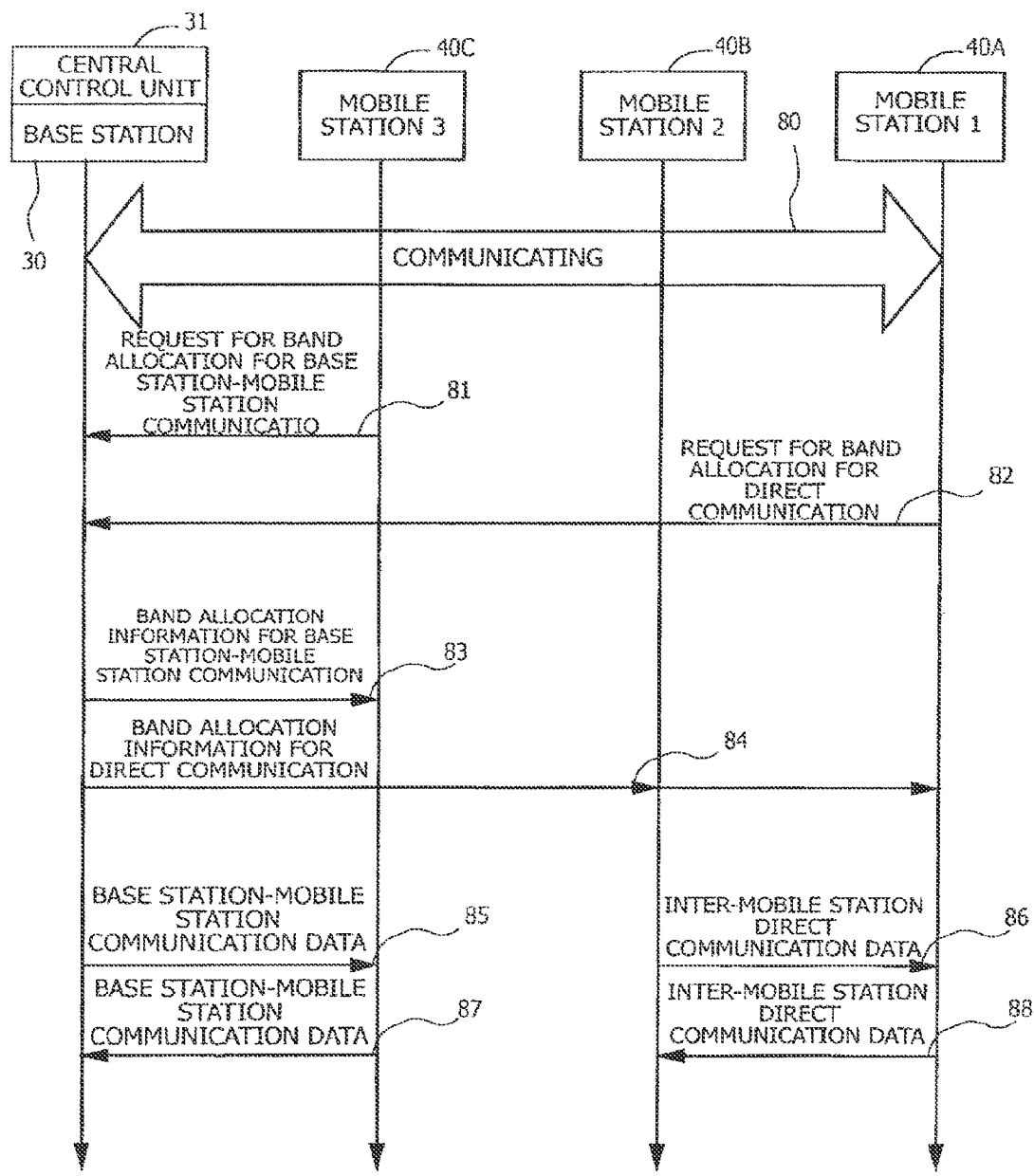
FIG. 7 shows a control sequence chart illustrating the flow of data in the wireless communication system.
Figure 8:
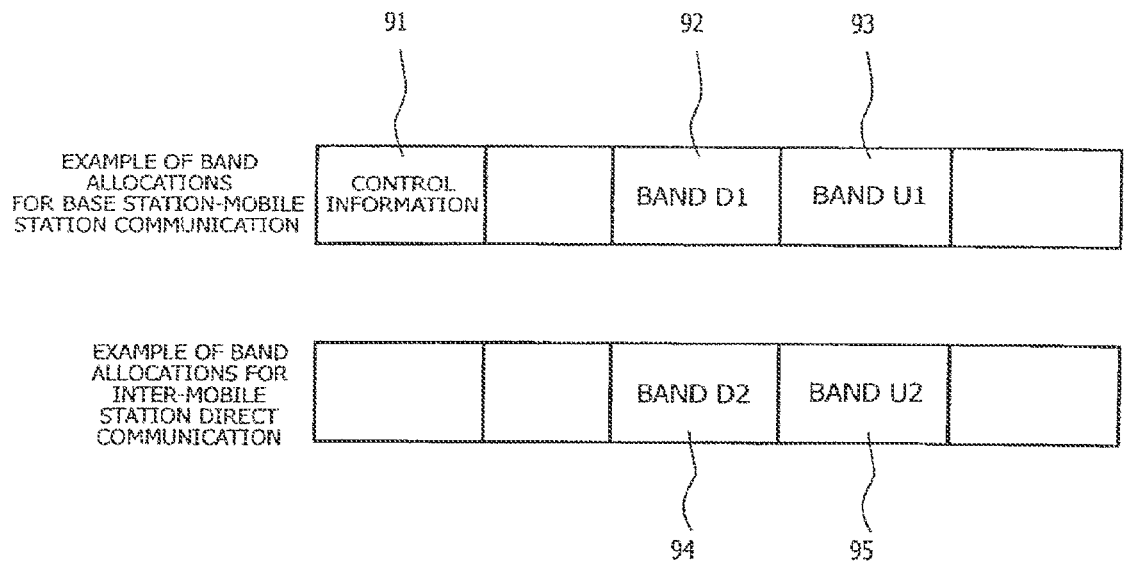
FIG. 8 shows a block diagram of band allocations in the wireless communication system.

FIG. 7 shows a control sequence illustrating the flow of data in the wireless communication system according to the second embodiment of the invention. FIG. 8 shows a block diagram of band allocation in the present wireless communication system, which corresponds to FIG. 2.

A wireless LAN can be constructed by using the present wireless communication system in the same manner as described in FIG. 3.

Referring to FIG. 7, it is assumed that the base station 30, mobile station 40A (mobile station <1>), mobile station 40B (mobile station <2>), and mobile station 40C (mobile station <3>) all have their communication lines open (80).

The mobile station 40C (mobile station <3>) transmits a communication band request (81) to the base station. The mobile station 40A (mobile station <1>) transmits a communication band request (82) to the mobile station 40B (mobile station <2>).

In response to these band requests, the central control unit 31 allocates a band 92 (band D1) and a band 93 (band U1) as communication bands between the base station 30 and the mobile station 40C (mobile station <3>) (83). The central control unit 31 also allocates a band 94 (band D2) and a band 95 (band U2) as communication bands between the mobile station 40A (mobile station <1>) and the mobile station 40B (mobile station <2>) (84). Numeral 91 designates control information. According to these allocations, the base station 30 and the mobile station 40C (mobile station <3>) communicate with each other (85, 87), while the mobile station 40A (mobile station <1>) and the mobile station 40B (mobile station <2>) communicate with each other (86, 88).

In accordance with the wireless communication system of the present embodiment, the base station 30 instructs that the inter-mobile station direct communication between the mobile station 40A (mobile station <1>) and the mobile station 40B (mobile station <2>) be conducted at a frequency other than that of the base station 30. Thus, the base station 30 can communicate with the mobile station 40C (mobile station <3>).

When the direct communication between the mobile station 40A (mobile station <1>) and the mobile station 40B (mobile station <2>) is conducted at the same frequency as that of the base station 30, the base station 30 cannot transmit or receive data on that band. However, in accordance with the present embodiment, the base station 30 can transmit and receive data on all of the bands (times) in the frame because the direct communication between the mobile stations 40A and 40B is conducted at a different frequency.

Thus, an efficient wireless communication system can be realized in which a single base station can use a plurality of frequencies for communication.

Third Embodiment

This is an example where the manner in which communication frame bands are allocated is changed.

Figure 9:
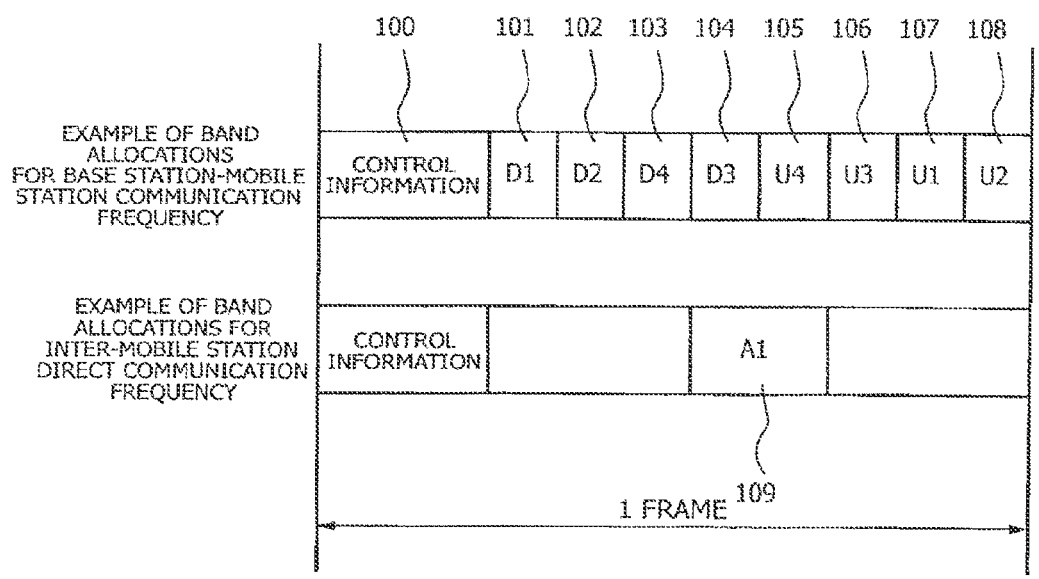
FIG. 9 shows a block diagram of frame allocations in the wireless communication system.

FIG. 9 shows a block diagram of frame allocation in the wireless communication system according to the third embodiment of the invention, indicating examples of band allocations in frames for the base station-mobile station communication frequency and the inter-mobile station direct communication frequency.

A wireless LAN can be constructed using the present wireless communication system in the same manner as described in FIG. 3.

Referring to FIGS. 3 and 9, the base station 30 broadcasts frame synchronization and band allocations in control information 100. Down-link phases D1 (101), D2 (102), D3 (104), and D4 (103) are allocated bands for transmission from the base station 30 to the mobile station 40A (mobile station <1>), mobile station 40B (mobile station <2>), mobile station 40C (mobile station <3>), and mobile station 40D (mobile station <4>) (not shown in FIG. 3), respectively. Similarly, Up-link phases U1 (107), U2 (108), U3 (106), and U4 (105) are allocated bands for transmission from the mobile station 40A (mobile station <1>), mobile station 40B (mobile station <2>), mobile station 40C (mobile station <3>), and mobile station 40D (mobile station <4>), respectively, to the base station 30. A1 (109) is an allocation band for a direct communication between the mobile station 40A (mobile station <1>) and the mobile station 40B (mobile station <2>). While in this example the number of the direct communication frequency is one, there may be more than one such frequency as long as they can be used in the wireless communication system.

Figure 10:
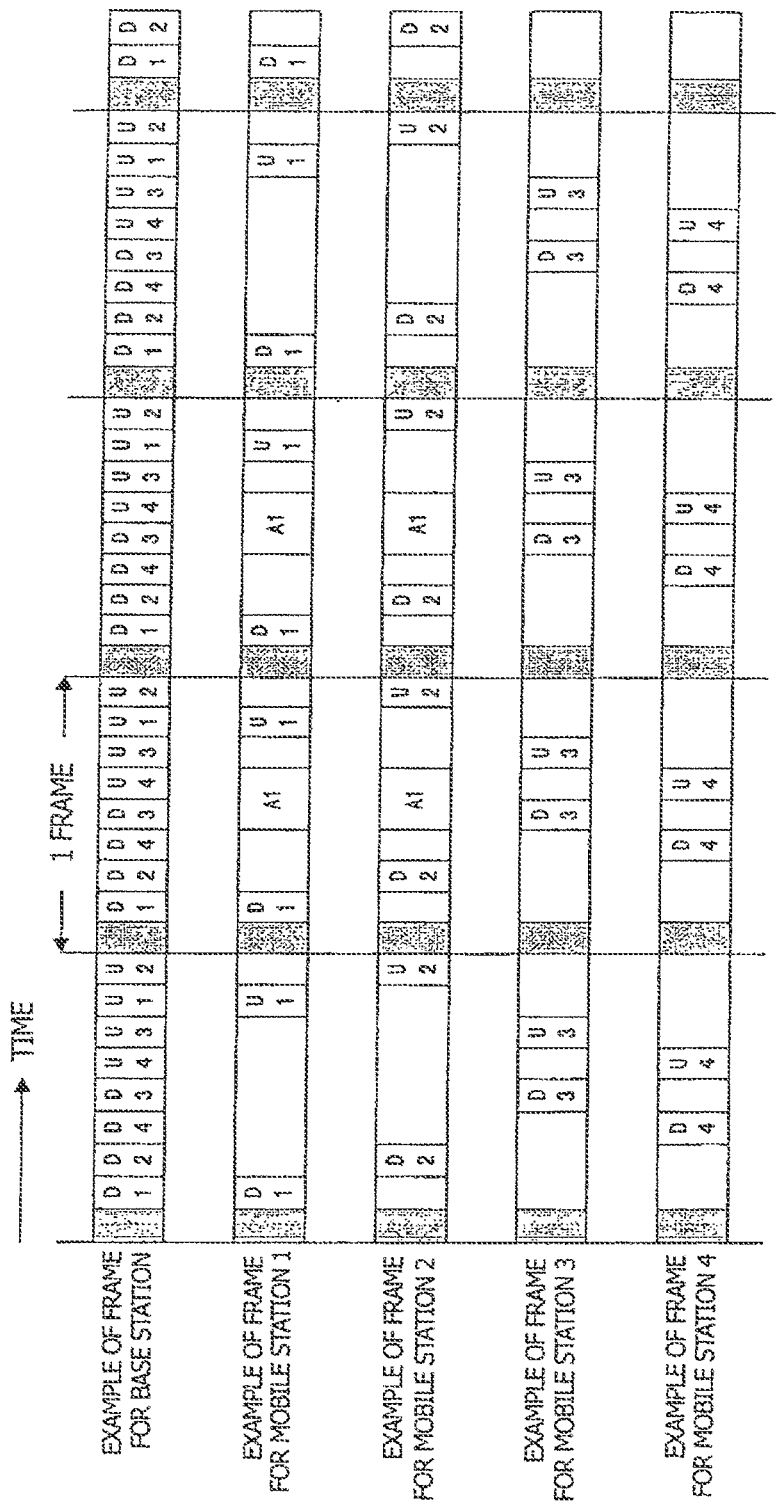
FIG. 10 shows an example of a state of communication between the base station and the mobile stations in the wireless communication system.

FIG. 10 shows an example of communication between the base station and the mobile stations in the present wireless communication system, illustrating the state of communication at each communication terminal allocated in FIG. 9.

The base station 30 broadcasts the control information (including band allocation information) for frame synchronization, transmits information to the individual mobile stations in D1, D2, D3, and D4, and receives information from the individual mobile stations in U1, U2, U3, and U4. In this example, the states of communication in about four frames are illustrated on the assumption that there is no change in allocations.

The mobile station 40A (mobile station <1>) receives the control information from the base station 30, receives information from the base station 30 in D1, and transmits information to the base station 30 in U1. The mobile station 40A (mobile station <1>) carries out a direct communication with the mobile station 40B (mobile station <2>) in an allocation A1 at a frequency different from that for the base station-mobile station communication, as shown in the second and third frames from the head.

Thus, the mobile station 40A (mobile station <1>) can directly communicate with the mobile station 40B (mobile station <2>) while at the same time communicating with the base station 30. Further, because the direct communication is carried out at a separate frequency, the base station 30 can communicate with the mobile station 40C (mobile station <3>) and mobile station 40D (mobile station <4>), even while the direct communication is taking place.

Fourth Embodiment

This is an example where the manner in which bands in a communication frame are allocated is changed.

Figure 11:
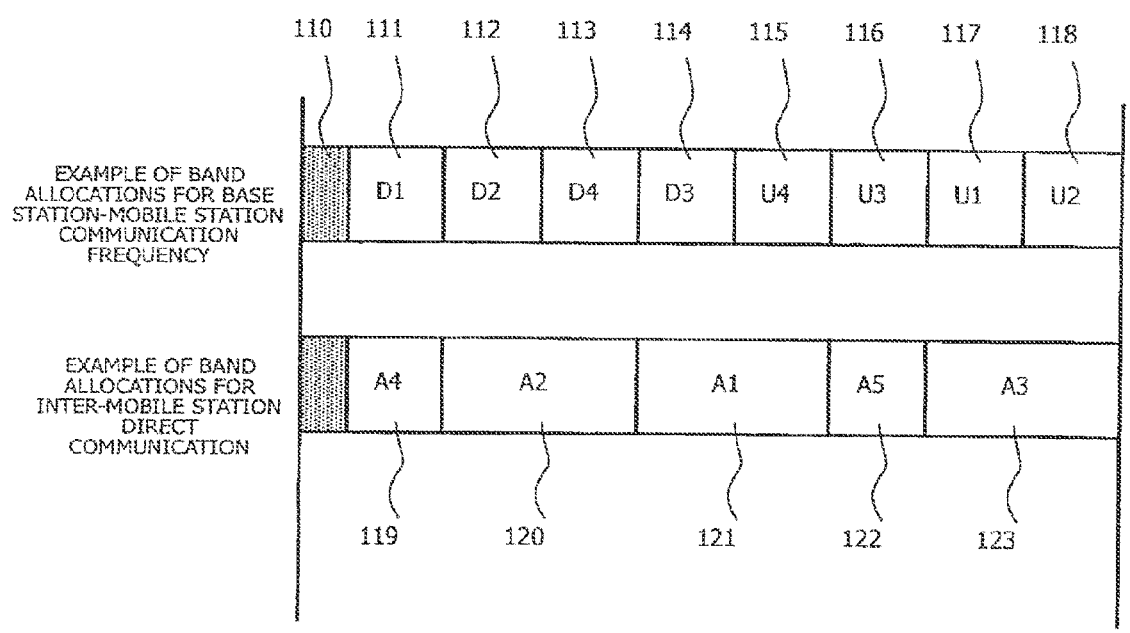
FIG. 11 shows a block diagram of frame allocation in the wireless communication system.

FIG. 11 shows a block diagram of frame allocation in the wireless communication system according to the fourth embodiment of the invention, illustrating examples of band allocations in frames for base station-mobile station communication and inter-mobile station direct communication frequencies.

A wireless LAN can be constructed by using the present wireless communication system in the same manner as described in FIG. 3.

Referring to FIGS. 3 and 11, for the base station-mobile station communication frequency, control information (110) for frame synchronization, Down-link phases D1 (111), D2 (112), D3 (114), and D4 (113) are allocated bands for transmission from the base station to the mobile station 40A (mobile station <1>), mobile station 40B (mobile station <2>), mobile station 40C (mobile station <3>), and mobile station 40D (mobile station <4>) (not shown in FIG. 3), respectively. Up-link phases U1 (117), U2 (118), U3 (116), and U4 (115) are allocated bands for transmission from the mobile station 40A (mobile station <1>), mobile station 40B (mobile station <2>), mobile station 40C (mobile station <3>), and mobile station 40D (mobile station <4>), respectively, to the base station. A1 (121), A2 (120), A3 (123), A4 (119), and A5 (122) are allocations for direct communication between the mobile stations <2> and <3>, the mobile stations <1> and <3>, the mobile stations <1> and <2>, the mobile stations <1> and <4>, and the mobile stations <3> and <4>.

Figure 12:
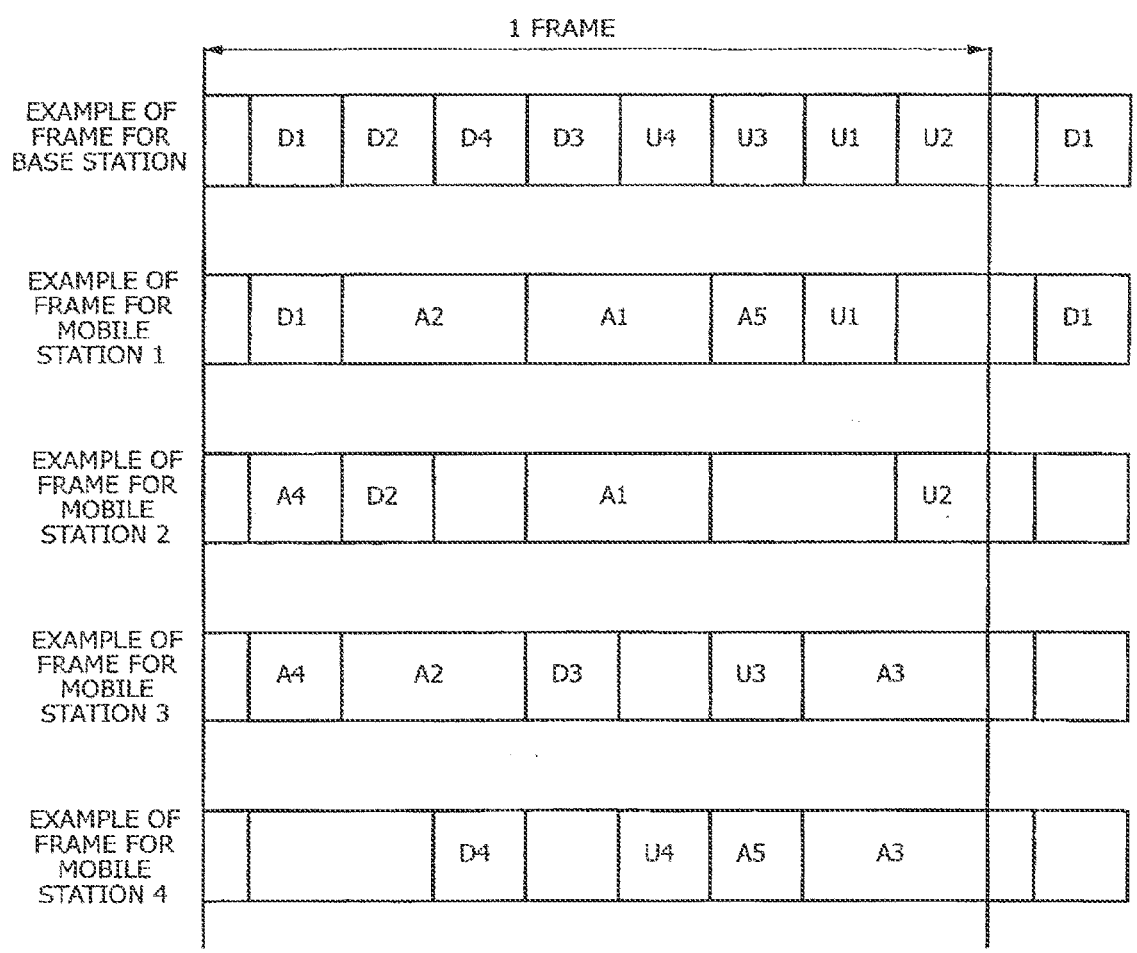
FIG. 12 shows an example of a state of communication between the base station and the mobile stations in the wireless communication system.

FIG. 12 shows an example of communication between the base station and the mobile stations in the present wireless communication system, illustrating the state of communication at each communication terminal allocated in FIG. 11.

For example, in D1 where the mobile station 40A (mobile station <1>) is communicating with the base station, the mobile station 40A (mobile station <1>) cannot communicate with any other mobile station unless the mobile station 40A (mobile station <1>) is provided with a plurality of wireless transmission/reception units.

Thus, the central control unit 31 (FIG. 3) provides allocations for direct communication in bands other than D1, as shown in FIG. 12.

In the present embodiment, the central control unit 31 calculates combinations for carrying out base station-mobile station communication and inter-mobile station direct communication based on the band allocation requests from each mobile station and the base station, provides efficient allocations that maximally utilize the wireless bands, as shown in FIG. 11, and notifies the base station 30 as well as broadcasts to each mobile station about their allocations. By such a centralized manner of control, frequencies can be completely utilized without the stand-by times for avoiding collision of signals that are required in autonomous decentralized systems such as according to IEEE802.11. Furthermore, the central management of the requests for inter-mobile station direct communication and base station-mobile station communication by the single central control unit 31 allows transmission and reception to occur without collision of allocations.

In the above-described embodiments, the invention is applied to a wireless communication system comprising the base station 30, the mobile stations 40 wirelessly connected to the base station 30, and the central control unit 31 provided within the base station 30 for allocating bands in the frames of communication frequencies in response to band allocation requests. However, the invention can be applied to any system as long as it is a TDMA-based wireless communication system. For example, the invention can be applied to cordless telephone systems in which a master unit is connected to a plurality of slave units via wireless communication, PDAs (Personal Digital Assistants) with wireless communication capabilities, and small-sized notebook personal computers.

The wireless communication system may also be comprised of a plurality of identical wireless terminals having functions both as base stations, namely masters that manage communications, and as mobile stations, namely slaves that follow the master's instructions, each wireless terminal carrying out both base station and mobile station operations.

INDUSTRIAL FIELD OF APPLICABILITY

Thus, the wireless communication system according to the invention allows inter-mobile station direct communication and base station-mobile station communication to take place simultaneously, or inter-mobile station direct communication to take place while maintaining connection with the base station, when inter-mobile station direct communication is carried out at a frequency other than that of the base station (see FIGS. 9 and 10).

Further, because the base station controls inter-mobile station direct communication, the burden on the mobile stations can be reduced.

Further, because inter-mobile station direct communication can be carried out at a second frequency that is different from the first frequency used in base station-mobile station communication, the base station can carry out transmission or reception of data even in time regions where inter-mobile station direct communication is taking place, for example. Thus, an efficient wireless communication system can be realized in which the base station can utilize a plurality of frequencies for communication.

What is claimed is:

1. A method for a wireless station of a wireless LAN to communicate wireless signals using a plurality of frequency bands, wherein the plurality of frequency bands includes a primary frequency band and at least one additional frequency band, the method comprising:

transmitting, by the wireless station, a wireless control signal via the primary frequency band to an additional wireless station, wherein the wireless control signal comprises a request to send communication data to the additional wireless station from the wireless station and a request to allocate a time period for transmitting the communication data;

receiving, at the wireless station, a wireless response signal from the additional wireless station in response to transmitting the wireless control signal, wherein the wireless response signal is received via the primary frequency band instead of the at least one additional frequency band, and indicates (i) an allocated time period and (ii) that the at least one additional frequency band is allocated to the wireless station for transmitting the communication data during the allocated time period; and simultaneously transmitting, by the wireless station during the allocated time period, a first wireless communication data signal via the primary frequency band and at least one second wireless communication data signal via the at least one additional frequency band, wherein at least one of the first wireless communication data signal and the at least one second wireless communication data signal includes the communication data, and wherein the first wireless communication data signal and the at least one second wireless communication data signal are time-synchronized.

2. The method of claim 1, wherein the additional wireless station is a base station of the wireless LAN.

3. The method of claim 1, wherein the wireless station transmits signals via the wireless LAN using carrier sense multiple access with collision avoidance.

4. The method of claim 1, wherein the wireless station transmits signals via the wireless LAN using time division multiple access.

5. A method for a wireless station of a wireless LAN to communicate wireless signals using a using a plurality of frequency bands, wherein the plurality of frequency bands includes a primary frequency band and at least one additional frequency band, the method comprising:
 receiving, by the wireless station, a wireless control signal via the primary frequency band from an additional wireless station, wherein the wireless control signal comprises a request to send communication data to the additional wireless station from the wireless station and a request to allocate a time period for transmitting the communication data;
 transmitting, by the wireless station via the primary frequency band instead of the at least one additional frequency band, a wireless response signal in response to receiving the wireless control signal, wherein the wireless response signal indicates (i) an allocated time period and (ii) that the at least one additional frequency band is allocated to the wireless station for transmitting the communication data during the allocated time period; and
 receiving, by the wireless station, a first wireless communication data signal having the communication data via the at least one additional frequency band, wherein the first wireless communication data signal received via the primary frequency band is time-synchronized with a second wireless communication data signal that is simultaneously transmitted using the primary frequency band.

6. The method of claim 5, wherein the wireless station is a base station of the wireless LAN.

7. The method of claim 5, further comprising using carrier-sensing to confirm available frequency bands and generate control information that indicates that the at least one additional frequency band is allocated for transmission of the communication data.

8. A wireless station of a wireless LAN configured to communicate wireless signals using a plurality of frequency bands, wherein the plurality of frequency bands includes a primary frequency band and at least one additional frequency band, the wireless station comprising:
 a wireless signal processing circuit configured for:
  receiving a wireless control signal via the primary frequency band from an additional wireless station, wherein the wireless control signal comprises a request to send communication data to the additional wireless station from the wireless station and a request to allocate a time period for transmitting the communication data,
  transmitting, via the primary frequency band instead of the at least one additional frequency band, a wireless response signal in response to receiving the wireless control signal, wherein the wireless response signal indicates (i) an allocated time period and (ii) that the at least one additional frequency band is allocated to the wireless station for transmitting the communication data during the allocated time period, and
  receiving a first wireless communication data signal having the communication data via the at least one additional frequency band, wherein the first wireless communication data signal received via the primary frequency band is time-synchronized with a second wireless communication data signal that is simultaneously transmitted using the primary frequency band; and
 a control processing circuit configured for:
  decoding, from the received wireless control signal, the request to send the communication data and the request to allocate the time period,
  identifying the request to send the communication data and the request to allocate the time period for transmitting the communication data from the decoded wireless control signal, and
  encoding the wireless response signal with control information indicating (i) the allocated time period and (ii) that the at least one additional frequency band is allocated to the wireless station for transmitting the communication data during the allocated time period.

9. The wireless station of claim 8, wherein the wireless station is configured for using carrier-sensing to confirm available frequency bands and generating control information that indicates that the at least one additional frequency band is allocated for transmission of the communication data.

10. The wireless station of claim 8, wherein the wireless signal processing circuit is further configured for transmitting and receiving the wireless signals via the wireless LAN using carrier sense multiple access with collision avoidance.

11. The wireless station of claim 8, wherein the wireless signal processing circuit is further configured for transmitting and receiving the wireless signals via the wireless LAN using time division multiple access.

\* \* \* \* \*